(12) United States Patent
De Fenoyl et al.

(10) Patent No.: US 11,407,262 B2
(45) Date of Patent: Aug. 9, 2022

(54) INFLATION VALVE WITH BULB HAVING A BISYMMETRIC CAVITY FOR PASSAGE OF A TUBULAR CORE

(71) Applicant: Continental Automotive GmbH, Hannover (DE)

(72) Inventors: Baptiste De Fenoyl, Toulouse (FR); Guillaume Leger, Toulouse (FR)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 17/440,326

(22) PCT Filed: Mar. 23, 2020

(86) PCT No.: PCT/EP2020/057943
§ 371 (c)(1),
(2) Date: Sep. 17, 2021

(87) PCT Pub. No.: WO2020/193463
PCT Pub. Date: Oct. 10, 2020

(65) Prior Publication Data
US 2022/0144026 A1 May 12, 2022

(30) Foreign Application Priority Data
Mar. 22, 2019 (FR) ........................... 1902996

(51) Int. Cl.
*B60C 29/02* (2006.01)
*B60C 29/00* (2006.01)
*B60C 23/04* (2006.01)

(52) U.S. Cl.
CPC .......... *B60C 29/02* (2013.01); *B60C 23/0494* (2013.01); *B60C 29/005* (2013.01)

(58) Field of Classification Search
CPC .... B60C 29/02; B60C 29/005; B60C 23/0494
See application file for complete search history.

(56) References Cited

U.S. PATENT DOCUMENTS 2,995,168 A * 8/1961 Mccord ................... B60C 29/02
152/427
3,368,603 A 2/1968 Kuzyn
(Continued)

FOREIGN PATENT DOCUMENTS

EP 2445733 B1 10/2012
FR 2592841 A2 7/1987
(Continued)

OTHER PUBLICATIONS

English Translation of the Written Opinion for International Application No. PCT/EP2020/057943, dated Jun. 9, 2020, 4 pages.
(Continued)

*Primary Examiner* — Jason R Bellinger
(74) *Attorney, Agent, or Firm* — RatnerPrestia

(57) ABSTRACT

An inflation valve having a tubular core surrounded with an elastically deformable sleeve with a bulb widening toward the internal longitudinal end of the valve and bearing a sealing groove on its outer contour, the groove being adapted for receiving an edge of the orifice of the rim in its interior. There is a cavity between the bulb and the tubular core, having an oval-shaped outer periphery and a first spacing taken in a first direction radial to the tubular core that is greater than a second spacing taken in a second direction perpendicular to the first direction, a cross section of the inflation valve taken at the position of the cavity exhibiting symmetry with respect to the first and second directions.

8 Claims, 2 Drawing Sheets

(56) References Cited

U.S. PATENT DOCUMENTS

| | | | |
|---|---|---|---|
| 4,171,119 A * | 10/1979 | Lamson | B60C 29/02 |
| | | | 251/367 |
| 8,511,332 B2 | 8/2013 | Robert | |
| 10,940,723 B2 * | 3/2021 | Mieyan | B60C 29/002 |
| 2010/0171361 A1 | 7/2010 | Monjuvent et al. | |
| 2012/0103432 A1 | 5/2012 | Robert | |

FOREIGN PATENT DOCUMENTS

| | | | | |
|---|---|---|---|---|
| FR | 2903752 A1 | | 1/2008 | |
| FR | 2947214 A1 | | 12/2010 | |
| FR | 2983781 A | | 6/2013 | |
| FR | 3086887 A1 * | | 4/2020 | B60C 23/0494 |
| WO | 2013104786 A1 | | 7/2013 | |
| WO | WO-2020109571 A1 * | | 6/2020 | B60C 29/02 |

OTHER PUBLICATIONS

International Search Report and Written Opinion for International Application No. PCT/EP2020/057943, dated Jun. 9, 2020, 7 pages.
International Search Report and Written Opinion for International Application No. PCT/EP2020/057943, dated Jun. 9, 2020 (French), 11 pages.

* cited by examiner

[Fig. 1a]
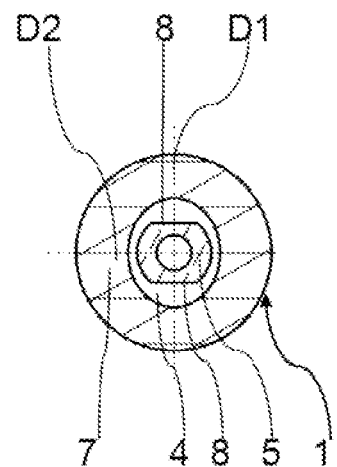
[Fig. 1b]
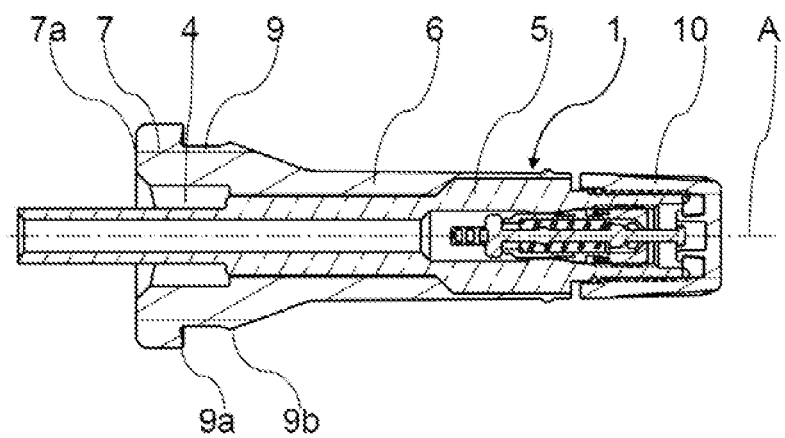
[Fig. 2]
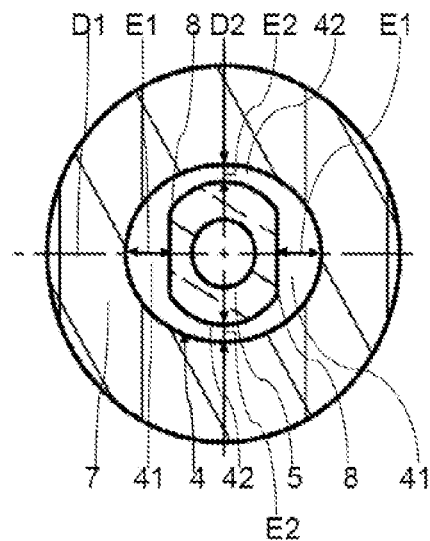

[Fig. 3]
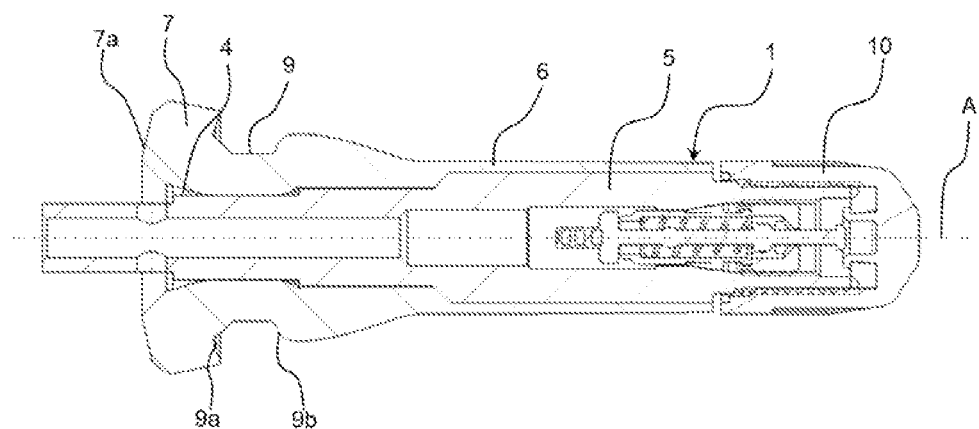
[Fig. 4]
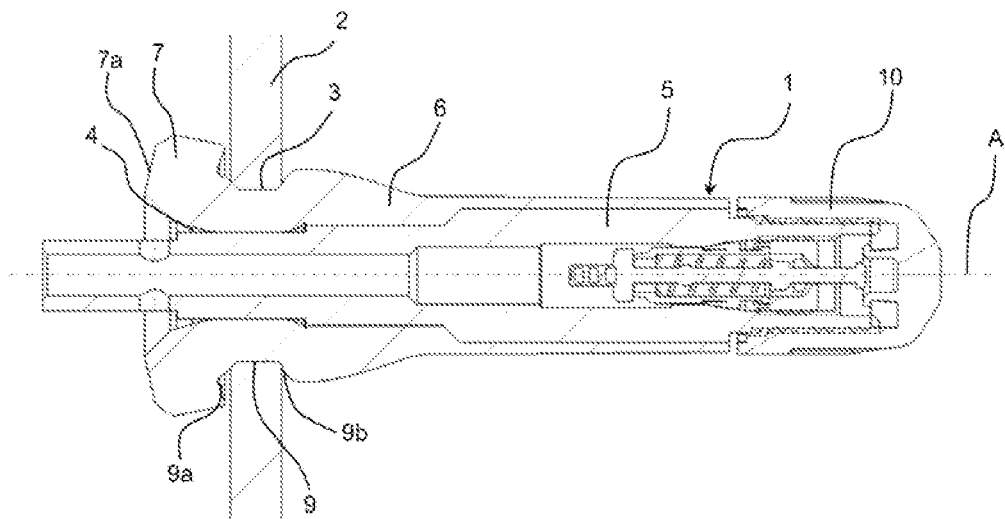

INFLATION VALVE WITH BULB HAVING A BISYMMETRIC CAVITY FOR PASSAGE OF A TUBULAR CORE

CROSS REFERENCE TO RELATED APPLICATIONS

This application is the U.S. National Phase Application of PCT International Application No. PCT/EP2020/057943, filed Mar. 23, 2020, which claims priority to French Patent Application No. 1902996, filed Mar. 22, 2019, the contents of such applications being incorporated by reference herein.

FIELD OF THE INVENTION

The present invention relates to an inflation valve to be positioned in a wheel rim orifice of a motor vehicle, the valve being of the elastic deformation type, this inflation valve having a cavity that is left empty between a bulb forming part of a sleeve and a tubular core.

The present invention also relates to an assembly of a wheel rim of a motor vehicle and of such an inflation valve.

BACKGROUND OF THE INVENTION

Such a valve has a tubular core adapted to form an internal air passage from an external longitudinal end of the valve to an internal longitudinal end, "external" and "internal" being taken to refer to the exterior and the interior of a rim through which such a valve passes.

The tubular core is at least partially surrounded by a sleeve of elastically deformable material from a longitudinal central portion toward the internal longitudinal end of the valve. The sleeve has the shape of a bulb that widens in proximity to the internal longitudinal end of the valve and ends with an internal longitudinal bulb end.

Such inflation valves of the elastic deformation type, also known as "snap in" valves, are widely used. Such valves may be combined with an electronic module for monitoring one or more operating parameters of the tire such as, for example, its pressure, its temperature and/or its rotation speed.

It is thus known that operating parameters of a wheel of a motor vehicle are measured by one or more sensors mounted in electronic modules, called electronic units for measuring operating parameters of a wheel tire or wheel units. These sensors may, for example and without restriction, be a pressure sensor in a tire mounted on a wheel and/or a radial acceleration sensor making it possible to determine the speed of rotation of the wheel.

In a known manner, wheel units generally include a microprocessor, a memory, a radiofrequency transmitter, a power-supply battery and at least one radial acceleration sensor capable of measuring the radial accelerations of the wheel, this radial acceleration sensor being mounted on a support forming a printed circuit board. The radial acceleration measurements are sent via radiofrequency by a radiofrequency wave emission device, frequently combined with the acceleration sensor, to a central system for monitoring the operating parameters of each wheel, and notably its rotation speed, called a central wheel control unit, the central monitoring system being inside the motor vehicle. This radiofrequency transmission device has antennas oriented precisely toward the central monitoring system so as to optimize transmissions. Consequently, such valves comprise a casing housing all the necessary electronic components.

The inflation valve associated with this electronic module is conventionally of two types. Either it is a metal inflation valve screwed into an orifice in a rim of the vehicle, or it is a valve of the elastic deformation type which is forced into the orifice of the rim by deformation of the elastic material forming its body. An aspect of the present invention relates more particularly to a valve of the elastic deformation type.

The concept of a deformation valve used hitherto for a tire pressure sensor consists in fixing the casing contain the electronic components to a tubular core which is, for example but not exclusively, made of brass. This is a rigid connection made by screws or another system, for example, a metal clip.

The valve has two main functions, namely ensuring the sealing of the rim, wheel and valve assembly during the life of the valve, and supporting the electronic elements contained in the valve and providing for mounting on the rim in a single step.

In both cases, during travel, the rubber bulb of the valve will stretch more and more until a leak or a tear in the rubber is created, thus limiting performance levels at high speed. A valve of the elastic deformation type then ceases to provide the requisite qualities of a valve, mainly those of ensuring sealing between the air contained in the tire and the exterior.

In addition, such elastically deformable valves have the particular feature of comprising a sealing groove in which an edge portion of an orifice provided on the rim will be inserted when the valve is placed on the wheel of the vehicle. The part of the rim housed in the sealing groove is thicker or thinner according to the vehicle model and the choice of rim size.

In a known way, most existing rims have a thickness of 1.5 to 5 mm, the most common thickness being about 2 millimeters, for reasons of material costs. A thickness of less than 2 millimeters detracts from the sealing of the valve.

The document FR-A-2 903 752, incorporated herein by reference, describes an inflation valve of the elastic deformation type, to be used in an assembly formed by a tire and a wheel, the wheel having a tire mounting rim provided with a valve orifice. The inflation valve comprises a deformable valve base, or bulb of a sleeve, intended to fix the valve in a sealing manner in the valve orifice, the valve base being provided with a peripheral groove designed to receive the edge of the valve orifice.

A rectilinear rigid tubular core with a circular cross section is provided, a first end of the core being designed to remain outside the tire and a second end thereof being provided with means for providing a link with a unit to be mounted inside the tire, the tubular core passing through the valve base. In this document, the inflation valve has a hollow annular space separating the tubular core from the valve base or bulb, and having a minimal volume.

Thus, according to this document, most inflation valves of the elastic deformation type have a cavity under a rim mounting area, positioned between an internal periphery of the bulb and an external periphery of the tubular core. This cavity has a considerable effect on the ease of mounting of the valve, and on its dynamic performance.

Inflation valves of the elastic deformation type have poor performance compared with other types of valve, called screw-in valves, owing to the low strength of the elastic materials of the bulb when subjected to high acceleration. The thickness of the elastic material of the bulb is limited externally by the rim diameter, and internally by the diameter of the tubular core, and of the cavity when present.

If the valve cavity is reduced to increase the amount of rubber and therefore the dynamic performance, it is difficult to insert the complete valve into the rim orifice for receiving the valve, owing to the small cavity volume available to allow for the deformation of the bulb made of elastic material, notably rubber.

If the valve cavity is enlarged to facilitate the insertion of the valve into the rim orifice, the retention of the bulb in the rim orifice is decreased and the inflation valve becomes impaired.

The document FR-A-2 947 214, incorporated herein by reference, discloses an inflation valve of the elastic deformation type, with a bulb in which the bulb volume is smaller in the area of the bulb directed toward the interior of the rim than it is in the area directed toward the exterior. This reduction takes place in the proximity of the groove intended to interact with the hole in the rim, both in the part of the bulb surrounding the tubular core and in the part in contact with the rim orifice.

This is achieved as a result of the presence of an asymmetric cavity enabling the amount of material in the bulb to be increased on one side, while retaining a larger cavity on the other side. Thus the part of the bulb surrounding the tubular core has, in its lower area, intended to be directed toward the interior of the rim, a coaxial blind recess extending over a circular sector in such a way that its mass is reduced in this area, while being increased in the diametrically opposed area of the bulb that is directed toward the exterior.

Such a valve must be oriented in a single position, since it has no plane of symmetry. The solid rubber side must be oriented toward the exterior along a radial direction of the rim, and the cavity, accordingly, must be oriented toward the interior of the rim. The tubular core has flats which are perpendicular to each other, and a counter-shape in the sensor for forming a wheel unit may be necessary.

Furthermore, a relatively large cavity intended to be directed toward the interior increases the possible clearance of the tubular core and therefore leads to additional fatigue of the elastic material of the bulb.

The fundamental problem faced by the present invention is therefore that of designing an inflation valve of the elastic deformation type which is easy to mount in a rim orifice, while being resistant to movement and essentially to any displacement due to centrifugal force.

SUMMARY OF THE INVENTION

To this end, an aspect of the present invention relates to an inflation valve to be positioned in a wheel rim orifice of a motor vehicle, the valve being of the elastic deformation type and having a tubular core adapted to form an internal air passage from an external longitudinal end of the valve toward an internal longitudinal end, extending around a longitudinal central axis, the tubular core being at least partially surrounded by a sleeve of elastically deformable material from a longitudinal central portion toward the internal longitudinal end of the valve, the sleeve having the shape of a bulb widening toward the internal longitudinal end of the valve and ending in an internal longitudinal bulb end, the bulb having a sealing groove which extends at least partially around the bulb on its outer contour and having internal and external edges, respectively, oriented toward the internal and external longitudinal ends of the valve, the groove being adapted for receiving an edge of the rim orifice in its interior, a cavity being present between the bulb and the tubular core and being remarkable in that the cavity has an external periphery of bisymmetric shape with a first spacing between, on the one hand, each first point of two opposed first points on a periphery of the cavity taken in a first direction radial to the tubular core, and, on the other hand, each point of a periphery of the tubular core aligned with the first direction and facing the first point of the periphery, the first spacing being greater than a second spacing between, on the one hand, each second point of two opposed second points on a periphery of the cavity taken in a second direction radial to the tubular core and perpendicular to the first direction, and, on the other hand, each point of a periphery of the tubular core aligned with the second direction and facing the second point of the periphery, a cross section of the inflation valve taken at the position of the cavity exhibiting symmetry with respect to the first and second directions.

An example of the prior art, illustrated notably by FR-A-2 903 752, proposed that the inflation valve has a hollow annular space separating the tubular core from the valve base or bulb, this space having a minimal volume.

In another example of the prior art, illustrated notably in the document FR-A-2 947 214, it was recognized that the external area of the valve at the position of the rim orifice had to be treated differently from its internal area. A compromise was therefore sought at the position of the bulb and the groove, because of the non-symmetric forces with the periphery of the rim orifice, as well as the presence of a cavity between the tubular core and the bulb limited to a portion of the periphery of the tubular core.

An aspect of the present invention follows a completely different path by proposing an inflation valve whose cross section is symmetric in two perpendicular directions, thus being bisymmetric.

In a first direction, the two first cavity portions are equal to each other and larger than the two second cavity portions. This is because, in a second direction perpendicular to a first direction, intended to be radial to the rim when the valve is mounted, the two first cavity portions are restricted while being equal.

The first two cavity portions, which are larger, facilitate the mounting of the inflation valve in the rim orifice, and the second, smaller, cavity portions make it possible to increase the mechanical strength, and therefore the durability, of the inflation valve in the rim orifice.

As well as improving the dynamic performance and retaining the ease of mounting, an aspect of the invention makes it unnecessary to provide any keying with respect to the casing. The inflation valve may equally well be mounted at 0° or 180°, that is to say with a second direction extending radially to the rim in both cases. This advantage is important for after-sales service, for which only one spare inflation valve is sold.

The bisymmetry of the inflation valve according to an aspect of the present invention enables it to be compatible for forming a wheel unit with sensors that are already in production. The bisymmetry is with respect to an axis passing through first direction and an axis passing through second direction, with different deviations in the first and second directions.

The joggling of the valve and sensor around the rim orifice is reduced, again due to increased rubber thickness in the second direction which is radial to the rim when the inflation valve is mounted. This enables the joggling and fatigue of the elastic material of the bulb, notably rubber, to be reduced.

Advantageously, the cavity is of ovalized shape. In this case, the major axis of the ovalized shape extends in the first direction and the minor axis of the ovalized shape extends in the second direction.

Advantageously, the cavity is continuous around the whole of the tubular core.

Advantageously, said first spacing is at least 1.4 millimeters and said second spacing is not more than 0.7 millimeters.

Advantageously, the cavity extends axially in the bulb between a first plane perpendicular to the tubular core passing through the external edge of the groove and a second plane perpendicular to the tubular core which is nearer to the internal longitudinal end of the bulb than is the internal edge of the groove. The cavity may extend at least over a length running from the external edge of the rim hole to the internal edge of the rim hole. However, it is advantageous to make it even larger, in order to strengthen its effect.

Advantageously, the internal longitudinal bulb end is positioned axially between the groove and the internal longitudinal end of the valve.

Advantageously, the tubular core is telescopic or non-telescopic.

Advantageously, the tubular core is made of two separate parts.

Advantageously, the internal longitudinal end of the valve is provided with means for fixing to an electronic unit for measuring at least one operating parameter of the tire.

Advantageously, the tubular core comprises, on an innermost longitudinal end portion, two opposed flats, each of the flats extending in a plane perpendicular to the first direction facing a respective cavity portion of greater width, each of the flats defining, with a portion of the external periphery of the cavity, a first hollow space, each of the two first hollow spaces being associated with the two second hollow spaces defined by the periphery of the tubular core, the first hollow spaces being larger in area than the second hollow spaces.

According to an optional embodiment of the present invention, the first hollow spaces may not be linked to the second hollow spaces, the spaces therefore being described as associated, a term covering a link between each first hollow space and a second hollow space on each of its sides, such as a separation of each first hollow space from a second hollow space on each of the sides of the first hollow space. In fact, the cavity may equally well be either discontinuous or continuous around the tubular core.

An aspect of the present invention also relates to an assembly of a motor vehicle wheel rim and an inflation valve, the inflation valve being placed in position through an orifice in the rim with one part outside the rim and one part inside the rim, characterized in that the valve is as described previously, the second direction extending radially with respect to a center of the rim.

Since the size of the cavity decreases radially to the rim but increases in a direction perpendicular to the direction radial to the rim, the overall cavity volume may or may not be retained. However, the thickness of elastic material in the direction radial to the rim is increased, providing better dynamic performance.

The advantage of this embodiment according to the present invention is that it permits greater flexibility in the distribution of this cavity volume. This does not necessarily correspond to the maximization of the cavity volume.

Since the overall cavity volume is retained, an excellent ease of mounting of the inflation valve is achieved. Thus, larger empty spaces are provided in a direction perpendicular to the direction radial to the rim, thereby increasing the ease of mounting.

BRIEF DESCRIPTION OF THE FIGURES

Other features, aspects and advantages of the present invention will be apparent from a perusal of the following detailed description and the attached drawings provided as non-limiting examples, in which:

FIG. 1A is a schematic representation of a cross-sectional view of an inflation valve according to an embodiment of the present invention at the position of the sealing groove borne by the bulb of the valve, FIG. 1B is a schematic representation of a view in longitudinal section of an inflation valve according to an embodiment of the present invention, FIG. 2 is an enlarged view of FIG. 1A, showing more clearly the cavity present between the tubular core and the bulb at the position of the sealing groove, the inflation valve having been rotated about itself through 90° with respect to FIG. 1A, FIG. 3 is a schematic representation of a view in longitudinal section of an inflation valve according to an embodiment of the present invention, the bulb being compressed at the position of its sealing groove, FIG. 4 is a schematic representation of a view in longitudinal section of an inflation valve mounted in a wheel rim orifice according to an embodiment of the present invention, the bulb being compressed at the position of its sealing groove by the edge of an orifice of a rim, the inflation valve having been mounted on the rim.

DETAILED DESCRIPTION OF THE INVENTION

In the following text, internal and external are considered with reference to the motor vehicle wheel rim, any element inside the rim and therefore inside the tire being qualified as internal and any element outside the rim and therefore outside the tire being qualified as an external element.

The term "valve" may equally well denote an inflation valve used solely for inflation and for sealing the tire borne by the rim, but may also denote a valve performing other functions by being a wheel unit, as mentioned above. Thus, the valve can incorporate an electronic unit for measuring at least one operating parameter of a tire, such as pressure, temperature, speed of rotation of the tire or other parameters.

With reference to all the figures, and mainly to FIGS. 1B, 3 and 4, an aspect of the present invention relates to an inflation valve 1 to be positioned in an orifice 3 of a wheel rim 2 of a motor vehicle, an orifice 3 and a wheel rim 2 of a motor vehicle being illustrated in FIG. 4.

The valve 1 is of the elastic deformation type, also known as a "snap-in valve". As mentioned above, this valve 1 may take the form of a wheel unit and may not be reduced to being used for the inflation and sealing of the tire on which the rim 2 is mounted, the valve 1 comprising an electronic module in the form of an electronic unit positioned inside the tire at an internal longitudinal end of the valve 1.

The valve 1 is of elongate shape and has a tubular core 5 adapted to form an internal air passage from an external longitudinal end of the valve 1 to an internal longitudinal end, extending around a central longitudinal axis A of the valve 1.

The external longitudinal end of the valve 1 may bear a protection and sealing plug 10. The valve 1 may also bear an electronic module in the form of an electronic unit at its internal longitudinal end, the electronic module not being shown in the figures.

For a valve 1 of the elastic deformation type, the tubular core 5 is at least partially surrounded by a sleeve 6 made of elastically deformable material. The tubular core 5 may be telescopic. The tubular core 5 may be telescopic or non-telescopic. A telescopic tubular core has a part of the core fixed with respect to the sleeve, while the other part is movable. The tubular core 5 may therefore consist of two separate parts, for example with a brass part and an aluminum part which are linked, being preferably rigid but possibly telescopic.

The sleeve 6 of elastically deformable material surrounds the tubular core 5 from a longitudinal central portion toward the internal longitudinal end of the valve 1, and possibly does not reach this internal longitudinal end of the valve 1, notably when the tubular core 5 is telescopic.

The sleeve 6 locally has a bulb shape 7 at its innermost longitudinal end, widening over its length in proximity to the internal longitudinal end of the valve 1. The bulb 7 terminates at an internal longitudinal bulb end 7a, which may be its widest portion.

The bulb 7 bears a sealing groove 9 which extends at least partially around the bulb 7 on its outer contour and has internal 9a and external 9b edges, facing the internal and external longitudinal ends of the valve 1 respectively.

The groove 9 may advantageously extend completely around the bulb 7, having as its center of rotation a point on the longitudinal central axis A of the valve 1, in a plane radial to the valve 1. The groove 9 may have a U-shaped cross section, the base of the U separating the internal 9a and external 9b edges forming the respective branches of the U.

Such a groove 9 is adapted for receiving in its interior an edge of the orifice 3 of the rim 2, advantageously a whole circumference of the edge of the orifice 3 of the rim 2.

Inside the bulb 7, a cavity 4 is formed between an internal periphery of the bulb 7 and a periphery of the tubular core 5.

With reference to FIGS. 1A and 2 more particularly, according to an aspect of the invention, the cavity 4 has an external periphery of bisymmetric shape in cross section. The cavity 4 has, in a first direction D1 intended to be perpendicular to a direction radial to the rim, a first spacing E1 between, on the one hand, each first point of two opposed first points of a periphery of the cavity 4 taken in the first direction D1 radial to the tubular core 5 and, on the other hand, each point of a periphery of the tubular core 5 aligned with the first radial direction D1 and facing the first point of the periphery.

The first spacing E1 is greater than a second spacing E2 taken between, on the one hand, each second point of two opposed second points of a periphery of the cavity 4 taken in a second direction D2 radial to the tubular core 5 and perpendicular to the first direction D1 and, on the other hand, each point of a periphery of the tubular core 5 aligned with the second radial direction D2 and facing the second point of the periphery.

A cross section of the inflation valve 1 taken at the position of the cavity 4 exhibits symmetry with respect to the first D1 and second D2 directions radial to the tubular core 5. For example, the cavity may be of rectangular or oval shape, or may not be continuous around the tubular core 5.

The first radial direction D1 represents the direction in which the cavity 4 is largest and the second radial direction D2 represents the direction in which the cavity 4 is smallest. For an oval-shaped cavity, which is only one preferred embodiment of the present invention, the first direction D1 is the direction of the major axis of the oval shape and the second direction D2 is the direction of the minor axis of the oval shape of the cavity 4.

In the position in which the inflation valve 1 is mounted in the orifice 3 of the rim 2, as shown in FIG. 4, the second direction D2 extends radially with respect to a center of the rim 2.

As may be particularly apparent from FIG. 2, the first spacing E1 may be at least two times greater than the second spacing E2. The cavity 4 may be continuous around the whole of the tubular core 5. For example, the first spacing E1 may be at least 1.4 millimeters and the second spacing E2 may be not more than 0.7 millimeters.

With reference to all the figures, the cavity 4 may extend axially to the tubular core 5 and to the inflation valve 1. The cavity 4 may thus extend axially in the bulb 7 between a first plane, perpendicular to the tubular core 5, passing through the external edge 9b of the groove 9 and a second plane, perpendicular to the tubular core 5, which is nearer to the internal longitudinal end 7a of the bulb 7 than is the internal edge 9a of the groove 9. This may be seen in FIGS. 1B, 3 and 4.

The internal longitudinal end 7a of the bulb 7 may be positioned axially between the groove 9 and the internal longitudinal end of the valve 1 formed by the internal end of the tubular core 5 extending beyond the end 7a of the bulb 7.

Although not shown in the figures, the internal longitudinal end of the valve 1 may be provided with means for fixing to an electronic unit for measuring at least one operating parameter of the tire.

With reference, notably, to FIG. 2, the tubular core 5 may comprise two opposed flats 8 at an innermost longitudinal end portion. Each of the flats 8 may extend in a plane perpendicular to the first radial direction D1, facing a respective portion of greatest width of the cavity 4.

As may be seen in FIG. 2, each of the flats 8 may define, with a portion of the external periphery of the cavity 4, a first hollow space 41. The first two hollow spaces 41, which face each other and have the first radial direction D1 passing through their central portion, may be associated with two second hollow spaces 42 defined by the periphery of the tubular core 5, and the first 41 and second 42 spaces may equally well be either linked or separated. If there is a link, and therefore a continuous cavity 4, each first hollow space 41 is positioned between two second hollow spaces 42.

The second hollow spaces 42 have the second direction D2, perpendicular to the first direction D1 radial to the tubular core 5, passing through their central transverse portions. As mentioned above, the second hollow spaces 42 have a smaller area than the first hollow spaces 41.

With more particular reference to FIG. 4, an aspect of the present invention also relates to an assembly of a motor vehicle wheel rim 2 and an inflation valve 1. The inflation valve 1 is placed in position through an orifice 3 in the rim 2, with one part outside the rim 2 and one part inside the rim 2.

The valve 1 is as described previously, the second direction D2 extending radially with respect to a center of the rim 2. Consequently there is a second hollow space located furthest outside the rim, being oriented toward the periphery of the rim, and a second hollow space located furthest inside the rim, being oriented toward the center of the rim.

FIGS. 3 and 4 show an inflation valve 1 with a bulb 7 compressed toward the tubular core 5, for example by the application of an edge of the orifice 3 of the rim 2 against the bottom of the groove 9, as shown, notably, in FIG. 4.

The cavity 4 between the tubular core 5 and the bulb 7 is then narrowed, and a portion of the bulb 7 forming the external periphery of the cavity is pressed toward the tubular core 5. This is the case, especially, for the two second hollow spaces 42 shown in FIG. 2, which are smaller than the two larger first hollow spaces 41, these first spaces 41 facilitating the mounting the valve 1 through the orifice 3 of the rim 2, while the second spaces 42 are of smaller size, so that the bulb 7 is correctly pressed against the tubular core 5, at least locally.

The invention claimed is:

1. An inflation valve to be positioned in an orifice of a wheel rim of a motor vehicle, the valve being of the elastic deformation type, the inflation valve comprising:

a tubular core adapted to form an internal air passage from an external longitudinal end of the valve toward an internal longitudinal end, extending around a longitudinal central axis, the tubular core being at least partially surrounded by a sleeve of elastically deformable material from a longitudinal central portion toward the internal longitudinal end of the valve, the sleeve having the shape of a bulb widening toward the internal longitudinal end of the valve and ending in an internal longitudinal end of the bulb, the bulb having a sealing groove extending at least partially around the bulb on an outer contour thereof and having internal and external edges oriented toward the internal and external longitudinal ends of the valve respectively, the groove being adapted for receiving an edge of the orifice of the rim in an interior portion of the groove, a cavity being present between the bulb and the tubular core, wherein the cavity has an external periphery of bisymmetric shape with a first spacing between each first point of two opposed first points on a periphery of the cavity taken in a first direction radial to the tubular core, and each first point of a periphery of the tubular core aligned with the first radial direction and facing the first point of the periphery of the cavity, the first spacing being greater than a second spacing between each second point of two opposed second points on the periphery of the cavity taken in a second direction radial to the tubular core and perpendicular to the first direction, and each point of the periphery of the tubular core aligned with the second direction and facing the second point of the periphery of the cavity, a cross section of the inflation valve taken at the position of the cavity exhibiting symmetry with respect to the first and second directions.

2. The inflation valve as claimed in claim 1, wherein the cavity is of oval shape.

3. The inflation valve as claimed in claim 1, wherein the cavity is continuous around the whole of the tubular core.

4. The inflation valve as claimed in claim 1, wherein said first spacing is at least 1.4 millimeters and said second spacing is not more than 0.7 millimeters.

5. The inflation valve as claimed in claim 1, wherein the cavity extends axially in the bulb between a first plane, perpendicular to the tubular core, passing through the external edge of the groove and a second plane, perpendicular to the tubular core, which is nearer to the internal longitudinal end of the bulb than is the internal edge of the groove.

6. The valve as claimed in claim 5, wherein the internal longitudinal end of the bulb is positioned axially between the groove and the internal longitudinal end of the valve.

7. The valve as claimed in claim 1, wherein the tubular core comprises, on an innermost longitudinal end portion, two opposed flats, each of the flats extending in a plane perpendicular to the first direction facing a respective portion of cavity of greater width, each of the flats defining, with a portion of the external periphery of the cavity, a first hollow space, each of the two first hollow spaces being associated with two second hollow spaces defined by the periphery of the tubular core, the first hollow spaces being larger in area than the second hollow spaces.

8. An assembly of a motor vehicle wheel rim and an inflation valve, the inflation valve being placed in position through an orifice of the rim with one part outside the rim and one part inside the rim, wherein the valve is as claimed in claim 1, the second direction extending radially with respect to a center of the rim.

* * * * *